United States Patent
Patil et al.

(10) Patent No.: US 10,942,836 B2
(45) Date of Patent: Mar. 9, 2021

(54) APPLICATION CURATION

(71) Applicant: Nutanix, Inc., San Jose, CA (US)

(72) Inventors: Mahesh Vinayak Patil, Cupertino, CA (US); Balaji Janakiram, Pune (IN); Pranav Yogesh Gupta, Bangalore (IN); Rohit Jayprakash Girme, San Jose, CA (US); Siyu Wei, Milpitas, CA (US); Vinod Gupta, Fremont, CA (US); Aditya Dipankar, Bangalore (IN); Jasnoor Singh Gill, Bangalore (IN); Aaditya Sood, Bangalore (IN); Ashutosh Kumar, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 54 days.

(21) Appl. No.: 16/171,348

(22) Filed: Oct. 25, 2018

(65) Prior Publication Data

US 2019/0340100 A1  Nov. 7, 2019

Related U.S. Application Data

(60) Provisional application No. 62/577,415, filed on Oct. 26, 2017.

(51) Int. Cl.
  *H04L 29/08* (2006.01)
  *G05B 19/418* (2006.01)
  (Continued)

(52) U.S. Cl.
  CPC ...... *G06F 11/3604* (2013.01); *G06F 11/3688* (2013.01)

(58) Field of Classification Search
  CPC ............. G06F 9/45558; G06F 9/45579; G06F 2009/45583; G06F 21/10; G06F 21/128;
  (Continued)

(56) References Cited

U.S. PATENT DOCUMENTS 6,282,712 B1  8/2001  Davis et al.
8,549,518 B1  10/2013  Aron et al.
(Continued)

FOREIGN PATENT DOCUMENTS

WO  2012/128968  9/2012

OTHER PUBLICATIONS

Pai et al., Pricing and competition in mobile app markets, 6 pages (Year: 2014).*

(Continued)

*Primary Examiner* — Thuy Dao
(74) *Attorney, Agent, or Firm* — Vista IP Law Group, LLP

(57) ABSTRACT

Methods, systems and computer program products for user-specific curation of applications from heterogeneous application sources. Multiple components are interconnected to perform user-specific curation operations. The user-specific curation operations comprise accessing application metadata corresponding to a plurality of applications from a plurality of application sources. The application sources may be heterogeneous and may be situated at local sites or at remote sites. A set of rules are applied to the application metadata to determine if one or more applications are authorized for use by a particular user or group. Publication attributes that control accessibility by a particular user or particular group of users are associated with the authorized applications. Based on the publication attributes as they apply to a particular user, one or more curated applications are selected from the authorized applications. A user-specific application marketplace is presented in a user interface to show a portion of the user-specific curated applications.

22 Claims, 10 Drawing Sheets

(51) Int. Cl.
*G06F 9/44* (2018.01)
*G06F 9/445* (2018.01)
*G06F 11/36* (2006.01)

(58) Field of Classification Search
CPC .......... G06F 21/12; G06F 21/30; G06F 21/50; G06F 2221/2141; G06F 9/5072; G06F 8/61; G06F 16/951; G06F 16/9535; G06F 21/604; G06F 21/629; G06F 11/3604; G06F 11/3688; H04L 67/10; H04L 67/1097; G06Q 30/02; G06Q 30/0251; G06Q 30/0631; G06Q 30/0601; G06Q 30/0641
See application file for complete search history.

(56) References Cited

U.S. PATENT DOCUMENTS

| | | | |
|---|---|---|---|
| 8,578,366 B2 | 11/2013 | Ricci | |
| 8,601,473 B1 | 12/2013 | Aron et al. | |
| 8,667,082 B2* | 3/2014 | Thomas | G06Q 30/06 709/217 |
| 8,850,130 B1 | 9/2014 | Aron et al. | |
| 8,935,321 B1 | 1/2015 | Sankaranarayanan | |
| 9,772,866 B1 | 9/2017 | Aron et al. | |
| 10,204,362 B2* | 2/2019 | Wang | G06Q 30/0601 |
| 2006/0074880 A1* | 4/2006 | Bukary | G06Q 10/00 |
| 2010/0299219 A1* | 11/2010 | Cortes | G06F 9/445 705/26.35 |
| 2011/0055355 A1 | 3/2011 | Lee et al. | |
| 2011/0250872 A1 | 10/2011 | Kim et al. | |
| 2011/0320307 A1* | 12/2011 | Mehta | G06Q 30/0641 705/26.7 |
| 2012/0109999 A1 | 5/2012 | Futty et al. | |
| 2012/0240236 A1* | 9/2012 | Wyatt | G06F 21/10 726/25 |
| 2012/0290583 A1* | 11/2012 | Mahaniok | G06Q 30/02 707/741 |
| 2013/0091557 A1 | 4/2013 | Gurrapu | |
| 2013/0212160 A1* | 8/2013 | Lawson | G05B 19/4185 709/203 |
| 2013/0290344 A1* | 10/2013 | Glover | G06F 16/24578 707/741 |
| 2014/0040978 A1 | 2/2014 | Barton et al. | |
| 2015/0025996 A1* | 1/2015 | Fishman | G06Q 30/0641 705/26.7 |
| 2015/0326528 A1* | 11/2015 | Murthy | H04L 69/22 726/1 |
| 2018/0157726 A1* | 6/2018 | Shah | G06F 16/252 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Cano, I. et al., "Curator: Self-Managing Storage for Enterprise Clusters", *14th USENIX Symposium on Networked Systems Design and Implementation, NSDI '17*, (Mar. 27, 2017).

* cited by examiner

APPLICATION CURATION

RELATED APPLICATIONS

The present application claims the benefit of priority to U.S. Patent Application Ser. No. 62/577,415 titled "APPLICATION CURATION", filed on Oct. 26, 2017, which is hereby incorporated by reference in its entirety.

FIELD

This disclosure relates to software publishing, and more particularly to techniques for application curation.

BACKGROUND

Many modern computing systems offer to its clients (e.g., users, groups of users, processes, etc.) a collection of software applications ("apps") that can be deployed to the computing systems. The software applications are often organized in an application marketplace or "app storefront" for presentation to the clients. The clients browse such app storefronts to select one or more apps to download and install on their respective computing system to perform some function or functions that are not native to the computing system. The apps available from a particular application source (e.g., app storefront, application repository, etc.) are often configured for operation on the specific computing system and/or environments in which they are presented.

For example, an app storefront on a particular mobile phone (e.g., a smart phone) will present apps that can run on the particular operating system and version (e.g., "OS1.2.2") of the mobile phone. Other app storefronts support a different set of apps for their respective systems and/or environments (e.g., Android, Windows, etc.). The most popular of these heterogenous application sources can present multiple millions of apps to its clients. Clients at some computing environments may even have access to applications from multiple heterogeneous sources. For example, in virtualization computing environments that support multiple operating systems, clients can access applications from a set of app storefronts that correspond to each of the supported operating systems.

Unfortunately, there are no mechanisms available to assist a client in selecting apps from such numerous collections of apps from multiple heterogenous application sources (e.g., app storefronts). Legacy techniques force the user to iterate through multiple collections and browse through the numerous app storefronts using whatever browsing and/or keyword search techniques might be available at each app storefront. This process is extremely time consuming and often surpasses the limit of human comprehension. For example, a user looking for a finance application might search the millions of available apps using a keyword "finance". However, the result set of such a keyword search could comprise hundreds or even thousands of apps. The user is then tasked to determine additional keywords and/or to manually analyze other information (e.g., app descriptions, app ratings, etc.) to reduce the result set to a manageable size.

With such legacy approaches, the user also has the responsibility to determine the comparative performance and/or security risk of a particular app. As the number of available apps presented to a client increases, the human and/or computing resources consumed in searching, analyzing, and selecting apps relevant to a client commensurately increases.

What is needed is a technique to analyze numerous applications from a plurality of heterogeneous application sources to determine a set of applications that are (1) properly authorized, (2) properly configured for a set of client-specific computing resources, and (3) relevant to a particular client.

SUMMARY

The present disclosure describes techniques used in systems, methods, and in computer program products for application curation, which techniques advance the relevant technologies to address technological issues with legacy approaches. Certain embodiments are directed to technological solutions for deployment of centralized application curation agents that facilitate client-specific curation of applications from multiple heterogeneous application sources so as to populate custom client-specific application marketplaces.

The disclosed embodiments modify and improve over legacy approaches. In particular, the herein-disclosed techniques provide technical solutions that address the technical problems attendant to how to determine, from numerous applications accessible from a plurality of heterogeneous application sources, a set of authorized and/or relevant applications to present to a client. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of computing cluster management as well as advances in various technical fields related to human interfaces pertaining to app storefront access.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
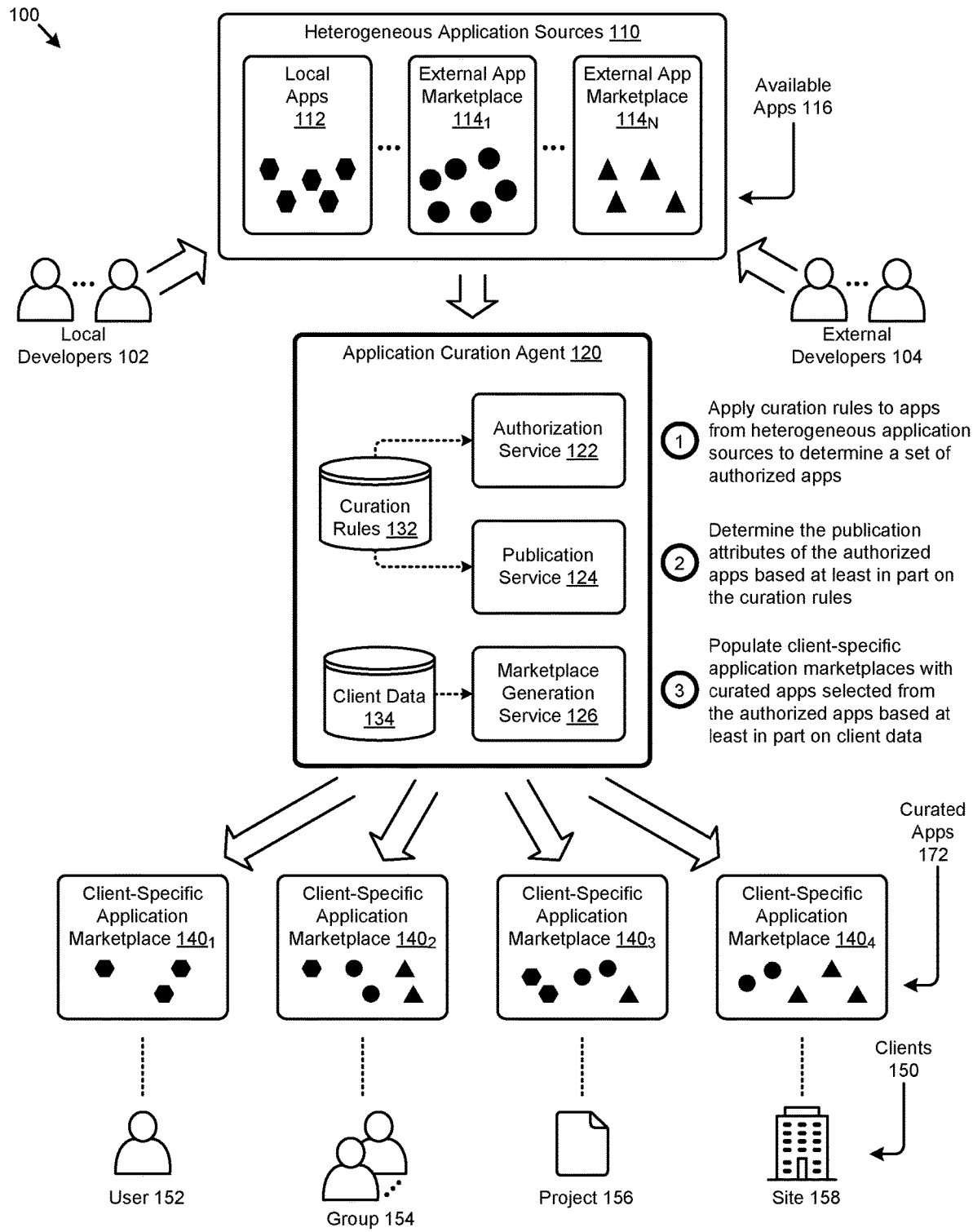
FIG. 1 illustrates a computing environment in which embodiments of the present disclosure can be implemented.

Embodiments in accordance with the present disclosure address the problem of how to determine, from numerous applications accessible from a plurality of heterogeneous application sources, a set of authorized and/or relevant applications to present to a client. Some embodiments are directed to approaches for deployment of centralized application curation agents that facilitate client-specific curation of applications from multiple heterogeneous application sources so as to populate custom client-specific application marketplaces for presentation to the client. The accompanying figures and discussions herein present example environments, systems, methods, and computer program products for application curation.

Overview

Disclosed herein are techniques for implementing a centralized application curation agent that facilitates client-specific curation of applications from multiple heterogeneous application sources to populate custom application marketplaces (e.g., app storefronts) that are specific to a particular user or client. As such, the curated contents of an app storefront that is presented to a first client (e.g., user) may be different from the curated contents of an app storefront that is presented to a second (different) client (e.g., user). In certain embodiments, a set of applications are accessed from multiple heterogenous application sources (e.g., app storefronts, application repositories, etc.). A set of curation rules are applied to the applications to determine a set of authorized applications. The authorized applications are processed against the curation rules to determine one or more publication attributes for the authorized applications. More specifically, curation rules are sets of logical tests or conditions that are applied over characteristics of an application or an application repository so as to make a decision as to whether or not to subject the application or an application repository to further processing.

Customized application marketplaces are populated with curated applications selected from the authorized applications based at least in part on criteria that derive from characteristics of the client (e.g., user, group of users, etc.) of the respective customized application marketplaces. In certain embodiments, the customized application marketplaces are generated responsive to an application view request from the client. In certain embodiments, the curation rules and/or the publication attributes are controlled at a user interface. In certain embodiments, the heterogeneous application sources comprise one or more sources that are local to a particular computing environment and one or more sources that are external to the particular computing environment.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

The diagram shown in FIG. 1 is merely one example of a computing environment 100 in which the herein disclosed techniques for application curation can be implemented. A large corpus of available apps 116 from a plurality of heterogeneous application sources 110 (e.g., app storefronts, application repositories, etc.) are available to a set of clients 150 (e.g., user 152, group 154, project 156, site 158, etc.) in computing environment 100. Heterogeneous application sources 110 can comprise a set of local apps 112 developed and presented (e.g., published) by local developers 102.

Such local apps might be developed by local developers that share with the client a common set of computing resources (e.g., a computing cluster of a particular enterprise).

Heterogeneous application sources 110 can further comprise one or more sets of external apps that are made available via any number of external app marketplaces (e.g., external app marketplace 114$_1$, and/or external app marketplace 114$_N$), which external apps have been developed and presented by external developers 104. Such external apps might be developed by external developers at respective sets of computing resources (e.g., at a respective app development firm) that are not shared with the client or with other developers. For reasons earlier discussed, a technique is needed to analyze the numerous applications from the heterogeneous application sources 110 to determine a set of applications that are (1) properly authorized, (2) properly configured for a set of client-specific computing resources, and (3) relevant to a particular client (e.g., user 152, group 154, project 156, site 158, etc.).

As can be observed in FIG. 1, the herein disclosed techniques address this need by implementing an application curation agent 120 that facilitates client-specific curation of applications from multiple heterogeneous application sources to populate custom application marketplaces (e.g., app storefronts) that are specific to a particular client. Specifically, the application curation agent 120 comprises an authorization service 122 that applies a set of curation rules 132 to the apps from the heterogeneous application sources 110 to determine a set of authorized apps (operation 1). Such authorization may be performed automatically based at least in part on the curation rules 132 and/or may involve manual intervention (e.g., by a system administrator). A publication service 124 determines various publication attributes (e.g., publication tags) of the authorized apps based at least in part on the curation rules (operation 2).

A marketplace generation service 126 at application curation agent 120 populates various client-specific application marketplaces with curated apps selected from the authorized (and tagged) apps based at least in part on a set of client data 134 associated with the respective clients of the corresponding client-specific application marketplaces (operation 3). For example, client-specific sets of curated apps 172 are presented in respective client-specific application marketplaces (e.g., client-specific application marketplace 140$_1$, . . . , client-specific application marketplace 140$_2$, . . . , client-specific application marketplace 140$_3$, . . . , client-specific application marketplace 140$_4$, etc.) based on client data (e.g., user attributes, etc.) associated with a particular client.

The techniques discussed as pertains to FIG. 1 and herein facilitate improvements in computer functionality as compared to other approaches. Specifically, rather than present the entire corpus of available apps 116 to every one of the clients 150, the herein disclosed techniques present a smaller, more manageable, client-specific sets of curated apps 172 in the client-specific application marketplace. The client-specific sets of curated apps 172 are selected to be applicable to each specific requesting client. As compared to prior approaches, the approaches disclosed herein serve to reduce the consumption of processing resources, storage resources, networking resources, and/or other computing resources. Implementing the herein disclosed techniques for application curation further improves the experience and productivity of the client when interacting with a large corpus of available applications.

Figure 2:
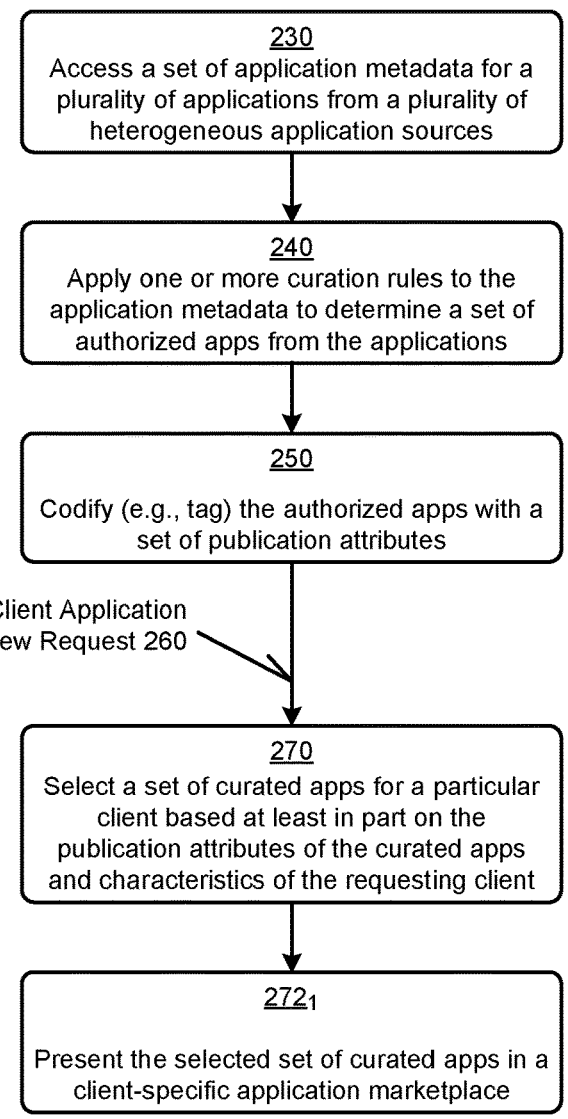
FIG. 2 depicts a client-specific application curation technique as implemented in systems that facilitate application curation, according to an embodiment.

An embodiment of the herein disclosed techniques as implemented in a client-specific application curation technique is shown and described as pertains to FIG. 2.

FIG. 2 depicts a client-specific application curation technique 200 as implemented in systems that facilitate application curation. As an option, one or more variations of client-specific application curation technique 200 or any aspect thereof may be implemented in the context of the architecture and functionality of the embodiments described herein. The client-specific application curation technique 200 or any aspect thereof may be implemented in any environment.

The client-specific application curation technique 200 presents one embodiment of certain steps and/or operations that facilitate rule-based curation of applications available to a set of clients. As shown, the client-specific application curation technique 200 can commence by accessing a set of application metadata corresponding to a plurality of applications from a plurality of heterogeneous application sources (step 230). For example, a computing system of a particular large enterprise may interact with multiple app storefronts that comprise applications that can operate in the computing system. One or more curation rules are applied to the application metadata to determine a set of authorized apps from the applications (step 240).

A set of rules (e.g., a rule base) such as the curation rules comprises data records storing various information that can be used to form one or more constraints to apply to certain functions and/or operations. For example, the information pertaining to a rule in the rule base might comprise the conditional logic operands (e.g., input variables, conditions, constraints, etc.) and/or operators (e.g., "if", "then", "and", "or", "greater than", "less than", etc.) for forming a conditional logic statement that returns one or more results and/or invokes one or more actions. For example, according to the herein disclosed techniques, certain inputs (e.g., one or more attributes from the application metadata) might be applied to curation rules to authorize applications that are developed by certain vendors. Other authorization criteria codified in the curation rules might pertain to app security, app performance, and/or other aspects of the applications. Various publication attributes (e.g., publication tags) included in the application metadata of the authorized apps are determined based at least in part on the curation rules (step 250). As an example, the curation rules might be consulted to determine publication tags that map the authorized apps to clients that would consider the apps relevant (e.g., to their role or function).

A set of curated apps for a particular client is selected based at least in part on the application metadata of the curated apps and/or certain characteristics of the client (step 270). As shown, step 270 might be performed responsive to a client application view request 260. Such a request might be invoked, for example, by a client (e.g., user) clicking on an app storefront icon in the client's workspace. In this case, the characteristics of the client might comprise attributes from a user profile. The curated apps selected specifically for the client are then presented in a client-specific marketplace that is accessible to the client (step 272$_1$). In accordance with the aforementioned example, the client-specific marketplace can be rendered in the client's workspace.

Figure 3:
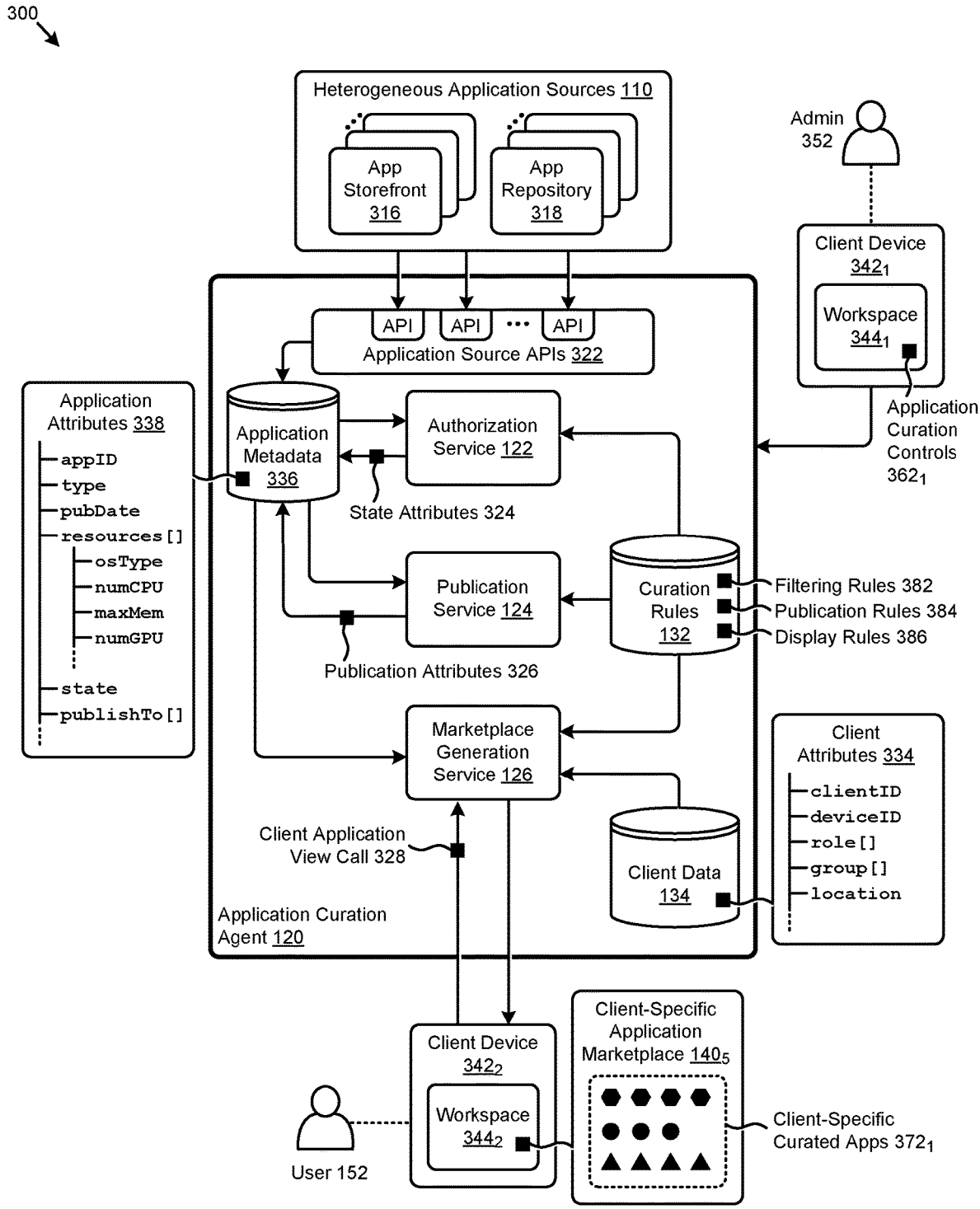
FIG. 3 is a block diagram of a system for application curation, according to some embodiments.

A detailed embodiment of a system, data flows, and data structures that implement the techniques disclosed herein is presented and discussed as pertains to FIG. 3.

FIG. 3 is a block diagram of a system 300 for application curation. As an option, one or more variations of system 300 or any aspect thereof may be implemented in the context of the architecture and functionality of the embodiments described herein. The system 300 or any aspect thereof may be implemented in any environment.

As shown in the embodiment of FIG. 3, application curation agent 120 interacts with heterogeneous application sources 110 and a set of representative client devices (e.g., client device 342$_1$ associated with admin 352, and client device 342$_2$ associated with user 152). Heterogeneous application sources 110 can comprise a plurality of app storefronts (e.g., app storefront 316) and/or a plurality of app repositories (e.g., app repository 318). The heterogeneous nature of the heterogeneous application sources 110 is due at least in part to the mechanisms for interacting with the various app storefronts and/or app repositories. Application curation agent 120 accommodates such variability in a set of application programming interfaces (APIs) such as application source APIs 322. Application source APIs 322 comprise a set of APIs that are designed to interact with a respective one or more heterogeneous application sources 110. Specifically, application source APIs 322 serve to collect the metadata corresponding to the applications from heterogeneous application sources 110 for storage in application metadata 336 at application curation agent 120.

Application metadata 336 and/or any other data described herein can be organized and/or stored using various techniques. For example, application attributes 338 associated with application metadata 336 indicate that the metadata might be organized and/or stored in a tabular structure (e.g., relational database table) that has rows that relate various attributes with a particular application. As another example, the information might be organized and/or stored in a programming code object that has instances corresponding to a particular application and properties corresponding to the various attributes associated with the application.

Specifically, as depicted in application attributes 338, a data record (e.g., table row or object instance) for a particular application might describe an application identifier (e.g., stored in a "appID" field), an application type (e.g., stored in a "type" field), a publication date (e.g., stored in a "pubDate" field), a set of computing resources used by the application (e.g., stored in a "resources []" object), and/or other application attributes. As shown, the "resources []" object might store an operating system type (e.g., stored in an "osType" field), a number of CPUs (e.g., stored in a "numCPU" field), a maximum memory consumed (e.g., stored in a "maxMem" field), a number of GPUs (e.g., stored in a "numGPU" field), and/or other computing resource attributes associated with a particular application. The application metadata may also comprise information pertaining to an application's state (e.g., stored in a "state" field), a list of publishing environments (e.g., stored in a "publishTo []" object), and/or other specialized data structures implemented to facilitate the herein disclosed techniques.

Authorization service 122 at application curation agent 120 accesses application metadata 336 and curation rules 132 to identify a set of authorized apps. Specifically, authorization service 122 applies a set of filtering rules 382 from curation rules 132 to application metadata 336 to determine a set of state attributes 324 for the applications represented in application metadata 336. As an example, state attributes 324 might indicate a particular application is in an authorization state, a pending state, an accepted state, a rejected state, or a published state. The state attribute for a particular application can be stored in the "state" field corresponding to the application (e.g., "thisapp.state=authorized", or "thisapp.state=accepted"), etc.).

Publication service 124 at application curation agent 120 accesses a certain portion of application metadata 336 (e.g., pertaining to applications in an authorized state) and curation rules 132 to determine various publication attributes for the applications represented in application metadata 336. Specifically, publication service 124 applies a set of publication rules 384 from curation rules 132 to the portion of application metadata 336 to determine a set of publication attributes 326 for the applications represented in the selected portion of application metadata 336. Publication attributes are values that control accessibility by a particular user, or by a particular group of users. Publication attributes may be codified as constant, static values, or publication attributes may be determined dynamically based on a formula and/or based on logic, and/or based on other values. As an example, publication attributes 326 might indicate a particular application is to be published into certain environments (e.g., the finance department, to Linux users, etc.) based on the application type (e.g., a finance-related application) or other characteristics. A publication attribute for a particular application can be stored in the "publishTo []" object corresponding to the application (e.g., "thisapp.publishTo.addToList=finance_department"). In certain embodiments, the operations performed at authorization service 122 (e.g., application authorization) and the operations performed at the publication service 124 (e.g., application tagging) are performed in parallel and/or asynchronously.

In some cases, admin 352 may interact with a set of application curation controls 362$_1$ in a workspace 344$_1$ at client device 342$_1$ to determine one or more curation rules 132, state attributes 324, publication attributes 326, and/or other information pertaining to the applications managed at application curation agent 120 in accordance with the herein disclosed techniques. For example, admin 352 might reject a particular application (e.g., due to a failure during testing) that would otherwise be authorized according to curation rules 132.

Marketplace generation service 126 at application curation agent 120 accesses a certain portion of application metadata 336 (e.g., pertaining to applications in an authorized state), curation rules 132, and client data 134 to populate client-specific application marketplaces with curated apps based at least in part on attributes from client data 134 that are associated with the respective clients of the corresponding client-specific application marketplaces. For example, responsive to a client application view call 328 from user 152 at client device 342$_2$, marketplace generation service 126 can apply a set of display rules 386 from curation rules 132 to the portion of application metadata 336 and/or the set of client attributes from client data 134 that are associated with user 152 and/or client device 342$_2$.

The outcome produced by evaluating the display rules 386 subject to the aforementioned application information and/or client-specific information is used to determine whether or not to present constituents of a set of client-specific curated apps 372$_1$ so they can be accessed from a client-specific application marketplace 140$_5$ at a workspace 344$_2$ of client device 342$_2$. As can be observed in a set of client attributes 334, the client attributes accessed by marketplace generation service 126 can comprise a client identifier (e.g., stored in a "clientID" field), a device identifier (e.g., stored in a "deviceID" field), a list of client roles (e.g., stored in a "role []" object), a list of client groups (e.g., stored in a "group []" object), a client location (e.g., stored in a "location" field), and/or other attributes associated with a particular client.

The components, data flows, and data structures shown in FIG. 3 presents merely one partitioning and associated data manipulation approach. The specific example shown is purely exemplary, and other subsystems and/or partitioning and/or data management approaches are reasonable.

The foregoing discussions describe a technique for determining a set of authorized apps from a collection of applications (e.g., step 240 of FIG. 2), which techniques are disclosed in further detail as follows.

Figure 4:
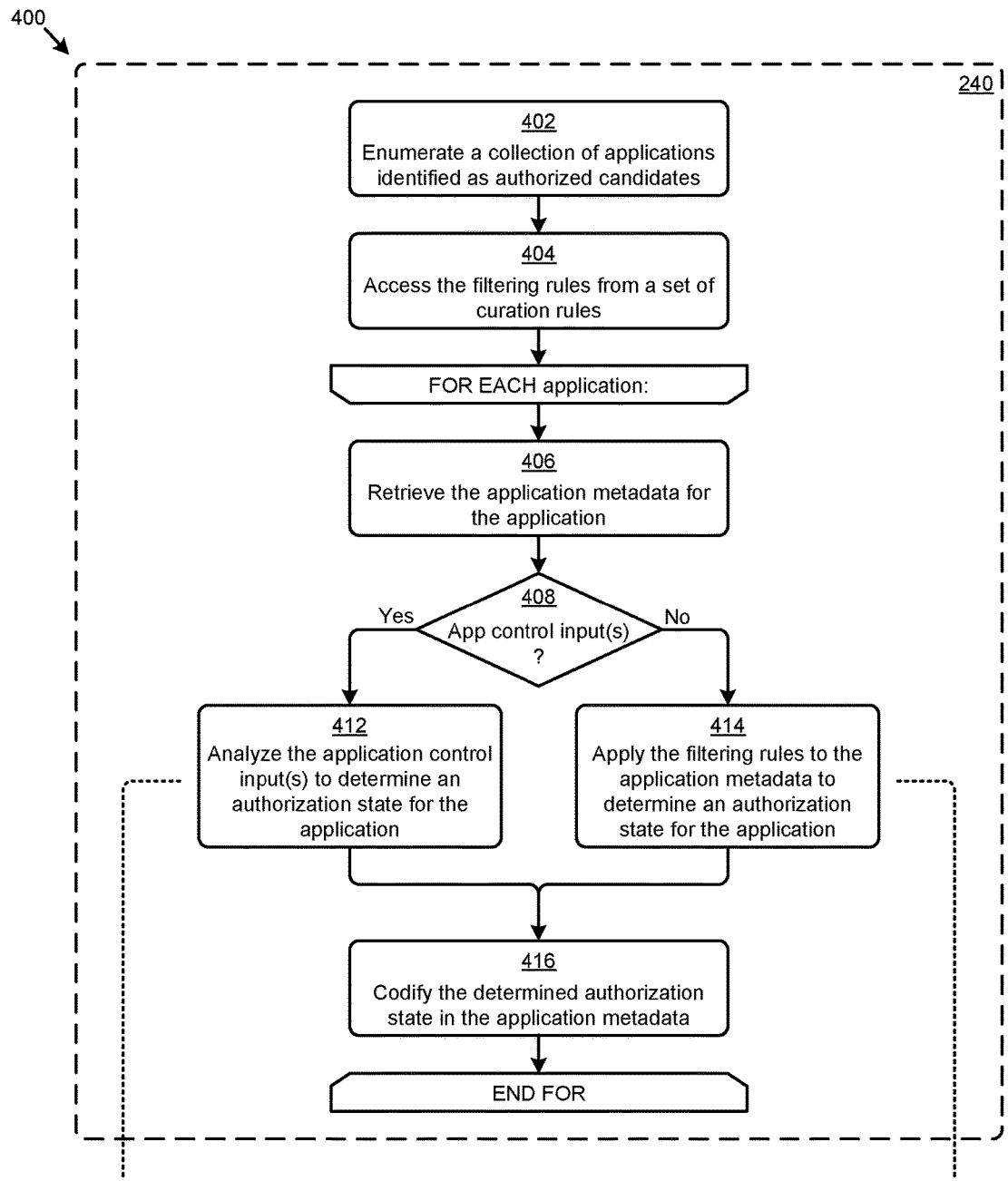
FIG. 4 presents an application authorization technique as implemented in systems that facilitate application curation, according to some embodiments.

FIG. 4 presents an application authorization technique 400 as implemented in systems that facilitate application curation. As an option, one or more variations of application authorization technique 400 or any aspect thereof may be implemented in the context of the architecture and functionality of the embodiments described herein. The application authorization technique 400 or any aspect thereof may be implemented in any environment.

The application authorization technique 400 presents one embodiment of certain steps and/or operations that identify a set of authorized applications from a collection of available applications, according to the herein disclosed techniques. Various representative examples are also presented to illustrate the application authorization technique 400.

As shown, the application authorization technique 400 can commence by enumerating a collection of applications identified as authorized candidates (step 402). As an example, the candidate applications might comprise apps (e.g., newly available apps) that have not yet been processed for authorization. Various filtering rules from a set of curation rules are accessed to facilitate the application authorization technique 400 (step 404). For each subject application from the enumerated applications, the application metadata for the application is retrieved (step 406). If there is(are) no application control input(s) pertaining to the application to consider (see "No" path of decision 408), the filtering rules are applied to the application metadata of the application to determine an authorization state for the application (step 414).

For example, and as shown in the example filtering rule 424, a rule might analyze the application type (e.g., "finance") to determine whether to authorize the application. If application control input(s) pertaining to the application is(are) to be considered (see "Yes" path of decision 408), any pertinent application control input(s) is(are) analyzed to determine an authorization state for the application (step 412). As shown in the example state controls 422, a "Rejected" state for the application might be selected (e.g., by a system administrator). The determined authorization state for the application is then codified in the application metadata for the application (step 416). As depicted in the example filtering rule 424, for example, the authorization state for an application of "type=finance" is codified in the application metadata by setting the application's "state" attribute to "accepted".

The foregoing discussions describe a technique for tagging applications with certain publication attributes (e.g., step 250 of FIG. 2), which techniques are disclosed in further detail as follows.

Figure 5:
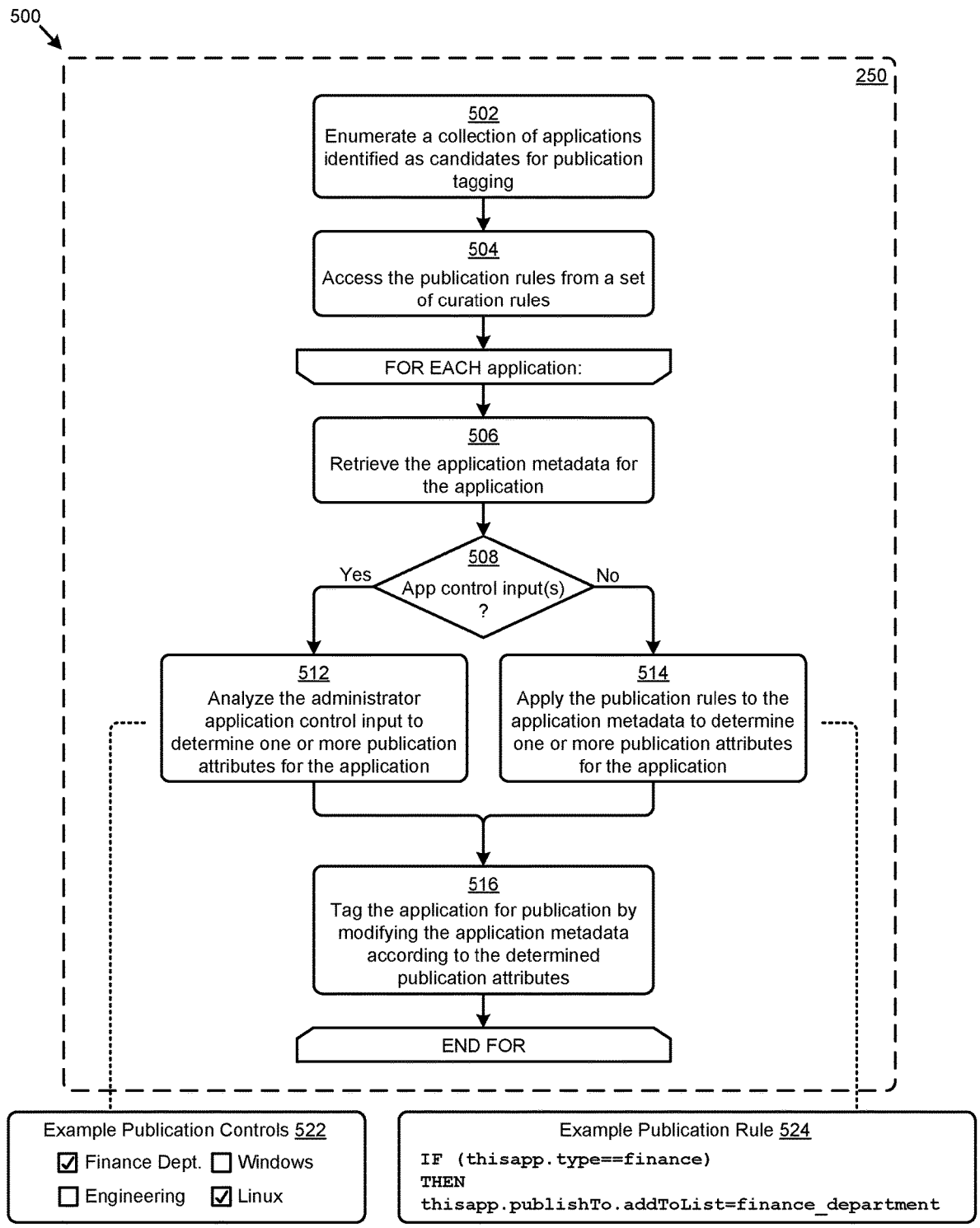
FIG. 5 presents an application tagging technique as implemented in systems that facilitate application curation, according to some embodiments.

FIG. 5 presents an application tagging technique 500 as implemented in systems that facilitate application curation. As an option, one or more variations of application tagging technique 500 or any aspect thereof may be implemented in the context of the architecture and functionality of the embodiments described herein. The application tagging technique 500 or any aspect thereof may be implemented in any environment.

The application tagging technique 500 presents one embodiment of certain steps and/or operations that tag certain applications (e.g., authorized applications) with publication attributes in accordance with the herein disclosed techniques. Various representative examples are also presented to illustrate the application tagging technique 500. As shown, the application tagging technique 500 can commence by enumerating a collection of applications identified as candidates for publication tagging (step 502). As an example, the candidate applications might comprise apps that have been authorized but have not yet been tagged for publication. Various publication rules from a set of curation rules are accessed to facilitate the application tagging technique 500 (step 504).

For each subject application from the enumerated applications, the application metadata for the application is retrieved (step 506). If there is(are) no application control input(s) pertaining to the application to consider (see "No" path of decision 508), the publication rules are applied to the application metadata of the application to determine one or more publication attributes (e.g., tags) for the application (step 514). For example, as shown in the example publication rule 524, a rule might analyze the application type (e.g., type ="finance") to determine the publication attribute(s) for the application. If application control input(s) pertaining to the application is(are) to be considered (see "Yes" path of decision 508), any pertinent application control input(s) is(are) analyzed to determine one or more publication attributes for the application (step 512).

As shown in the example publication controls 522, a "Finance Dept." publication tag and a "Linux" publication tag might be selected for the application (e.g., by a system administrator). The application is then tagged for publication by modifying the application metadata of the application in accordance with the determined publication attributes (step 516). As depicted in the example publication rule 524, for example, a "finance_department" tag is added to the "publishTo []" object (e.g., list) in the application metadata of applications of "type=finance". More specifically, publication rules are sets of logical tests or conditions that are applied over characteristics of an application or an application repository so as to tag the application with a display indication that is subsequently used in determining whether or not to present the application in a client-specific marketplace.

The foregoing discussions describe techniques for consideration of certain application curation control inputs when implementing the herein disclosed techniques. In some cases, control inputs and/or other information pertaining to techniques for application curation can be reviewed and/or defined in a user workspace (e.g., user interface) as disclosed in further detail as follows.

Figure 6:
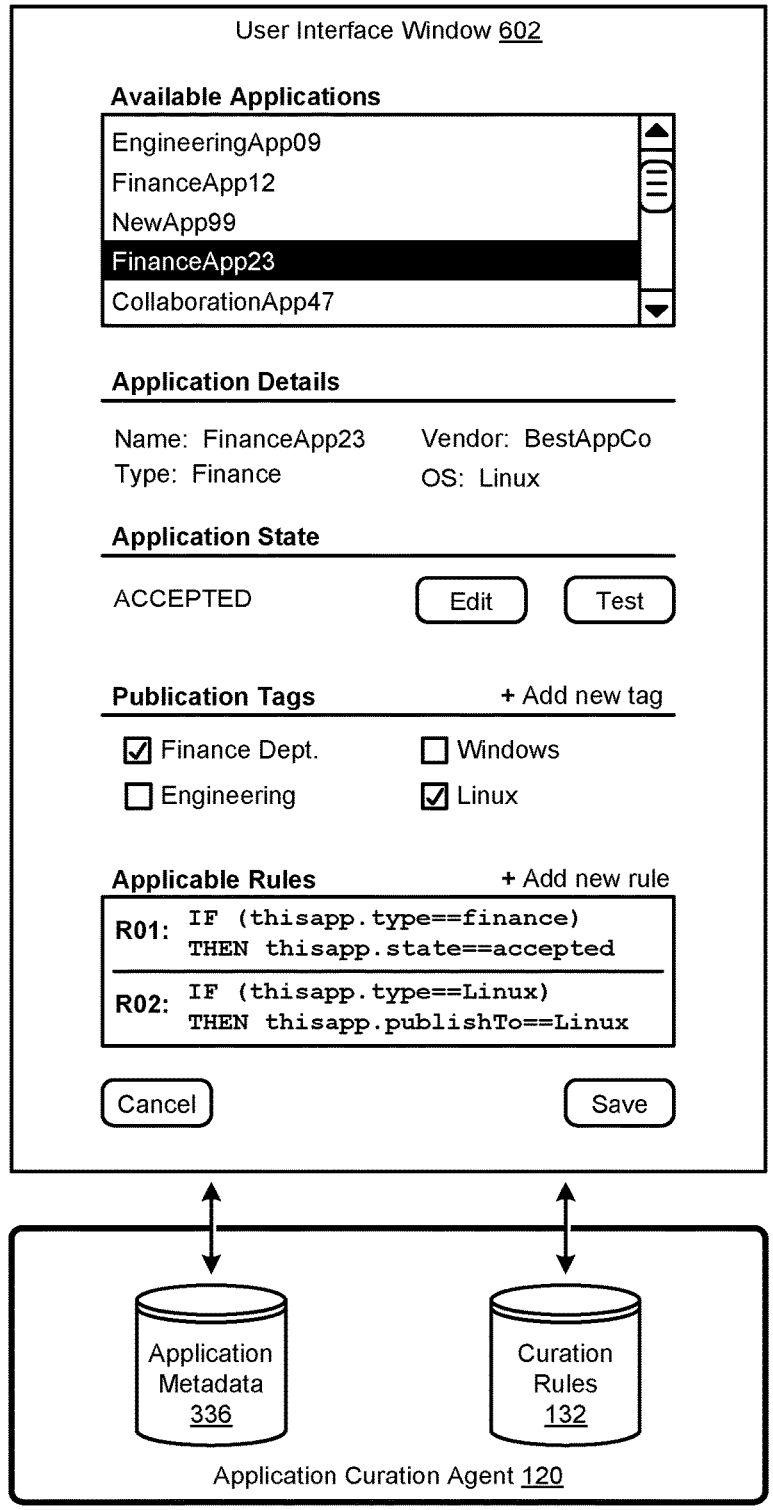
FIG. 6 illustrates an application curation control workspace as implemented in systems that facilitate application curation, according to some embodiments.

FIG. 6 illustrates an application curation control workspace 600 as implemented in systems that facilitate application curation. As an option, one or more variations of application curation control workspace 600 or any aspect thereof may be implemented in the context of the architecture and functionality of the embodiments described herein. The application curation control workspace 600 or any aspect thereof may be implemented in any environment.

The application curation control workspace 600 of FIG. 6 comprises a user interface window 602. As shown, admin 352 might interact with a set of application curation controls 3622 in user interface window 602 to facilitate the herein disclosed techniques as implemented in certain embodiments. Specifically, admin 352 might desire to view and/or edit certain attributes pertaining to a "FinanceApp23" application. For example, admin 352 might want to test the application by clicking a "Test" button. Responsive to the outcome of the test, admin 352 might click the "Edit" button to change the "Application State" from "ACCEPTED" to another state (e.g., "REJECTED"). Admin 352 may further control the "Publication Tags" of the application by selecting one or more of the shown publication tags (e.g., "Finance Dept.", "Engineering", "Windows", or "Linux") and/or adding and selecting a new publication tag. Admin 352 can further edit and/or add "Applicable Rules" (e.g., curation rule R01, curation rule R02) that can be applied to various apps according to the herein disclosed techniques. When admin 352 clicks the "Save" button, the inputs from application curation controls $362_2$ are codified in application metadata 336 and/or curation rules 132 at application curation agent 120, and/or processed by other components of application curation agent 120 in accordance with the techniques discussed herein.

When certain attributes (e.g., state attributes, publication attributes, etc.) are codified in the application metadata of a collection of applications, client-specific sets of curated applications from the applications can be selected for presentation in customized application marketplaces as disclosed in the following.

Figure 7:
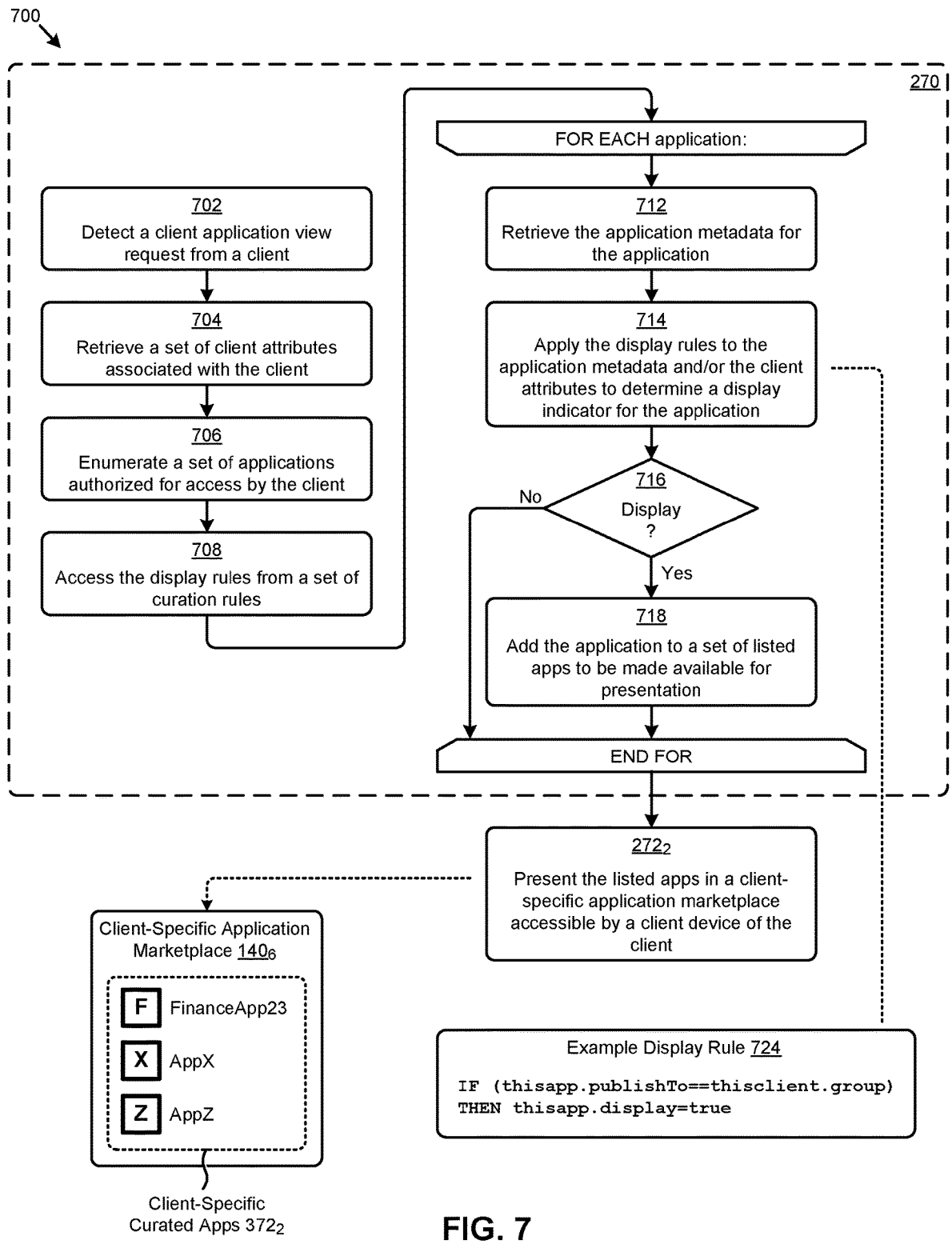
FIG. 7 depicts a customized application marketplace presentation technique as implemented in systems that facilitate application curation, according to some embodiments.

FIG. 7 depicts a customized application marketplace presentation technique 700 as implemented in systems that facilitate application curation. As an option, one or more variations of customized application marketplace presentation technique 700 or any aspect thereof may be implemented in the context of the architecture and functionality of the embodiments described herein. The customized application marketplace presentation technique 700 or any aspect thereof may be implemented in any environment. The customized application marketplace presentation technique 700 presents one embodiment of certain steps and/or operations that select a client-specific set of curated apps for presentation in a customized application marketplace to a particular client, according to the herein disclosed techniques. The depicted technique is merely one possible implementation of the functions of step 270 (of FIG. 2). Various representative examples are presented to illustrate the customized application marketplace presentation technique 700.

As shown, the customized application marketplace presentation technique 700 can commence by detecting a client application view request from a client (step 702). Various client attributes associated with the client are retrieved (step 704). A collection of applications authorized for access by the client are enumerated (step 706). Certain display rules from a set of curation rules are accessed to facilitate the customized application marketplace presentation technique 700 (step 708).

For each subject application from the enumerated applications, the application metadata for the application is retrieved (step 712). The display rules are applied to the application metadata of the application and/or the client attributes of the client to determine a display indicator for the application (step 714). For example, as shown in the example display rule 724, a rule might compare the publication tag (e.g., stored in a "publishTo" field) of an application to the group identifier (e.g., stored in a "group" field) of a client to determine the display indicator (e.g., "true" or "false" stored in an ephemeral "display" attribute). If the display indicator is positive (see "Yes" path of decision 716), the application is added to a list of curated apps (step 718). If the display indicator is negative (see "No" path of decision 716), no further action for the subject application is taken in this flow.

When all enumerated applications have been processed, the curated apps selected specifically for the client are then presented in a client-specific marketplace that is accessible to a client device of the client (step $272_2$). For example, and as illustrated, client-specific curated apps $372_2$ (e.g., "FinanceApp23", "AppX", and "AppZ") can be presented in a client-specific application marketplace $140_6$ on a display screen of any type of client device.

Additional Embodiments of the Disclosure

Additional Practical Application Examples

Figure 8:
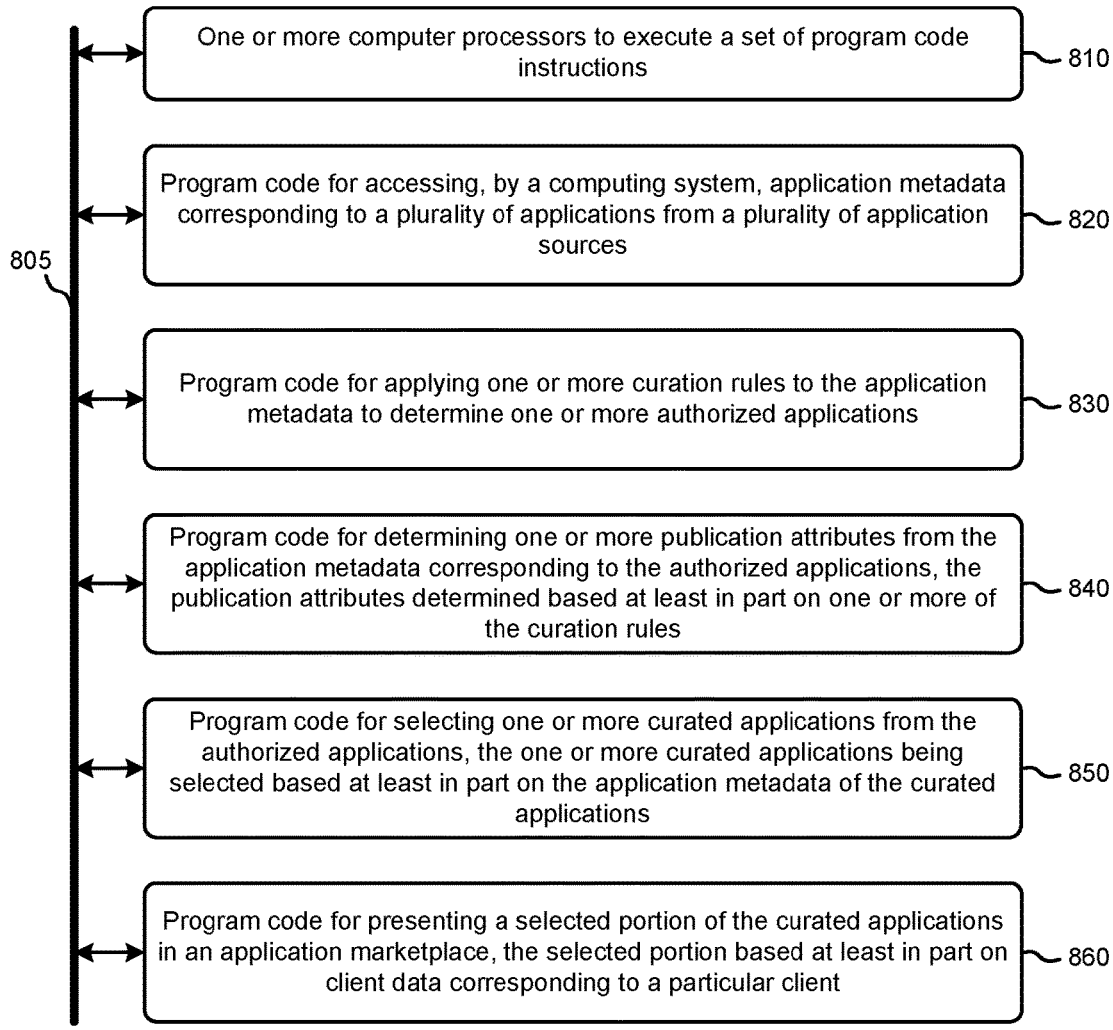
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually and/or as combined, serve to form improved technological processes that address determining, from numerous applications accessible from a plurality of heterogeneous application sources, a set of authorized and/or relevant applications to present to a client. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising one or more computer processors to execute a set of program code instructions (module 810) and modules for accessing memory to hold program code instructions to perform: accessing, by a computing system, application metadata corresponding to a plurality of applications from a plurality of application sources (module 820); applying one or more curation rules to the application metadata to determine one or more authorized applications (module 830); determining one or more publication attributes from the application metadata corresponding to the authorized applications, the publication attributes determined based at least in part on one or more of the curation rules (module 840); selecting one or more curated applications from the authorized applications, the one or more curated applications being selected based at least in part on the application metadata of the curated applications (module 850); and presenting a selected portion of the curated applications in an application marketplace, the selected portion based at least in part on client data corresponding to a particular client (module 860).

Variations of the foregoing may include more or fewer of the shown modules. Certain variations may perform more or fewer (or different) steps, and/or certain variations may use data elements in more, or in fewer or in different operations. Still further, some embodiments include variations in the operations performed, and some embodiments include variations of aspects of the data elements used in the operations.

System Architecture Overview

Additional System Architecture Examples

Figure 9A:
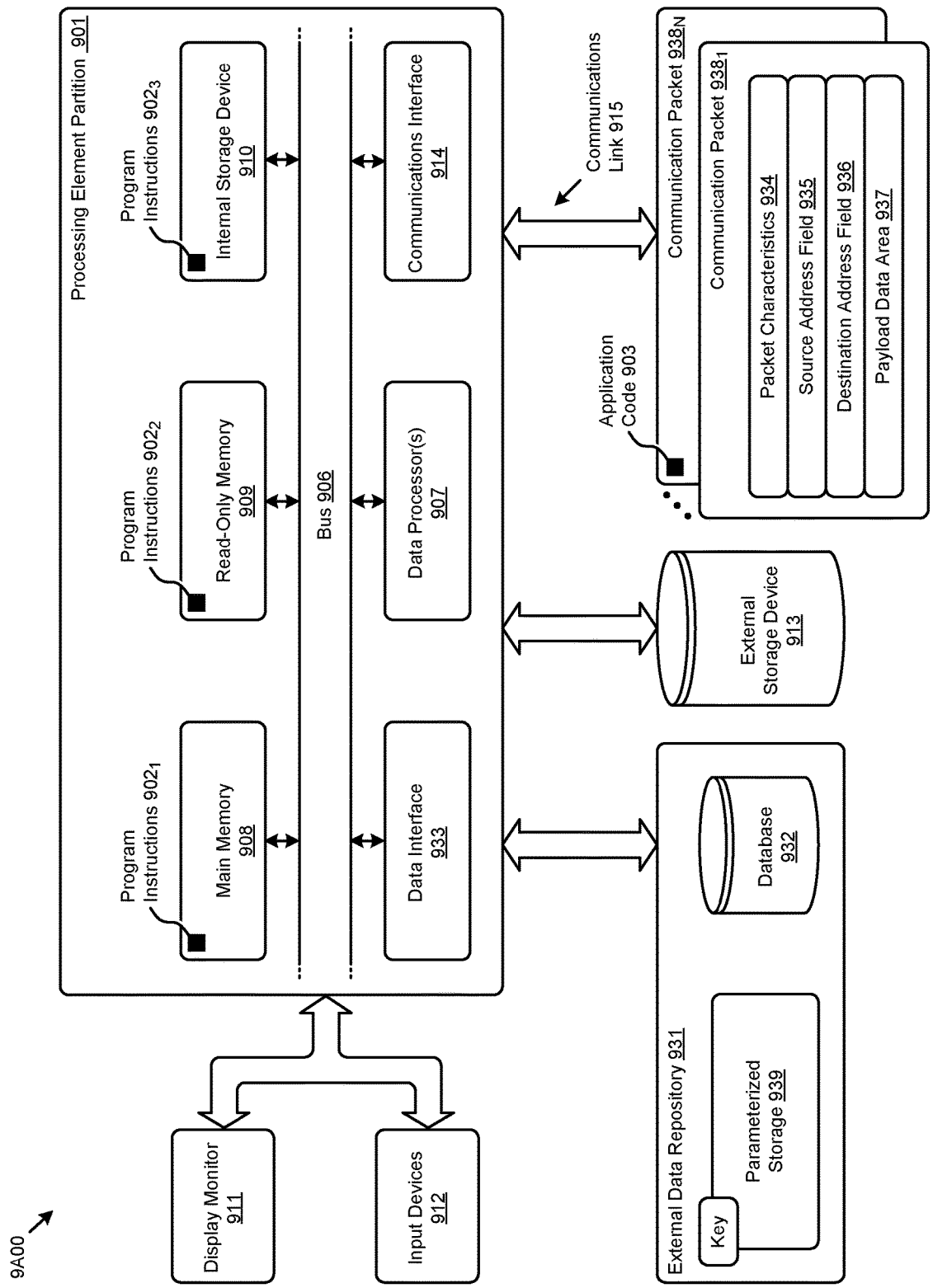
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. Computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program code instructions contained in a memory. Such instructions (e.g., program instructions $902_1$, program instructions $902_2$, program instructions $902_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of communications interface 914 may comprise one or more networking ports that are configurable (e.g., pertaining to speed, protocol, physical layer characteristics, media access characteristics, etc.) and any particular instance of communications interface 914 or port thereto can be configured differently from any other particular instance. Portions of a communication protocol can be carried out in whole or in part by any instance of communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

Communications link 915 can be configured to transmit (e.g., send, receive, signal, etc.) any types of communications packets (e.g., communication packet $938_1$, communication packet $938_N$) comprising any organization of data items. The data items can comprise a payload data area 937, a destination address 936 (e.g., a destination IP address), a source address 935 (e.g., a source IP address), and can include various encodings or formattings of bit fields to populate packet characteristics 934. In some cases, the packet characteristics include a version identifier, a packet or payload length, a traffic class, a flow label, etc. In some cases, payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of a computer system 9A00. According to certain embodiments of the disclosure, two or more instances of computer system 9A00 coupled by a communications link 915 (e.g., LAN, public switched telephone network, or wireless network) may perform the sequence of instructions required to practice embodiments of the disclosure using two or more instances of components of computer system 9A00.

Computer system 9A00 may transmit and receive messages such as data and/or instructions organized into a data structure (e.g., communications packets). The data structure can include program instructions (e.g., application code 903), communicated through communications link 915 and communications interface 914. Received program code may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

Processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to application curation. A module may include one or more state machines and/or combinational logic used to implement or facilitate the operational and/or performance characteristics pertaining to application curation.

Various implementations of database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of application curation). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to application curation, and/or for improving the way data is manipulated when performing computerized operations pertaining to deployment of centralized application curation agents that facilitate client-specific curation of applications from multiple heterogeneous application sources so as to populate custom client-specific application marketplaces.

Figure 9B:
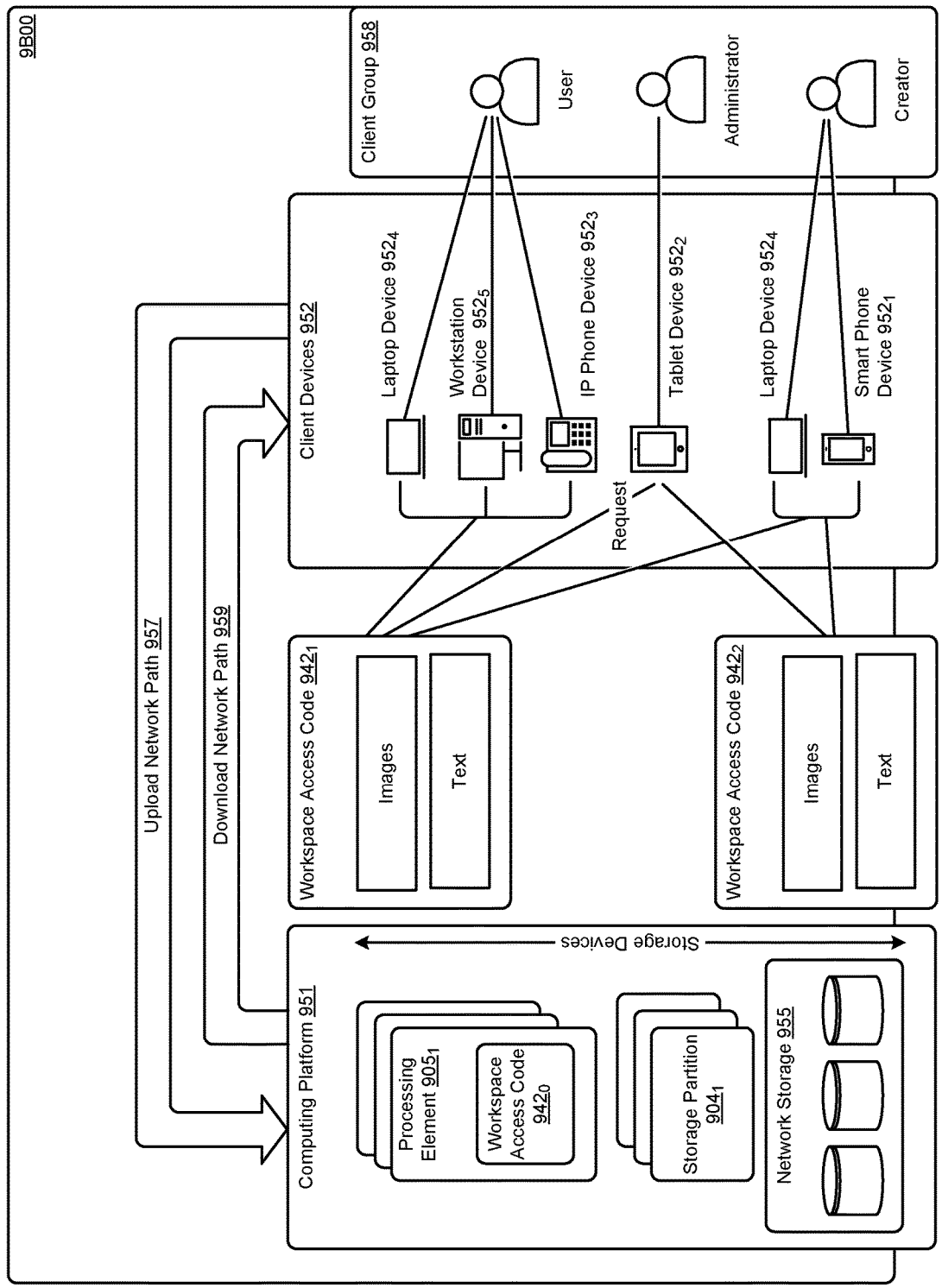

FIG. 9B depicts a block diagram of an instance of a cloud-based environment 9B00. Such a cloud-based environment supports access to workspaces through the execution of workspace access code (e.g., workspace access code 942$_0$, workspace access code 942$_1$, and workspace access code 942$_2$). Workspace access code can be executed on any of client devices 952 (e.g., laptop device 952$_4$, workstation device 952$_5$, IP phone device 952$_3$, tablet device 952$_2$, smart phone device 952$_1$, etc.). A group of users can form a client group 958, and a client group can be composed of any types or roles of users. For example, and as shown, a client group can comprise a user, an administrator, a creator, etc. Any user can use any one or more of the client devices, and such client devices can be operated concurrently to provide multiple concurrent sessions and/or other techniques to access workspaces through the workspace access code.

A portion of workspace access code can reside in and be executed on any client device. Any portion of the workspace access code can reside in and be executed on any computing platform 951, including in a middleware setting. As shown, a portion of the workspace access code resides in and can be executed on one or more processing elements (e.g., processing element 905$_1$). The workspace access code can interface with storage devices such as networked storage 955. Storage of workspaces and/or any constituent files or objects, and/or any other code or scripts or data can be stored in any one or more storage partitions (e.g., storage partition 904$_1$). In some environments, a processing element includes forms of storage, such as RAM and/or ROM and/or FLASH, and/or other forms of volatile and non-volatile storage.

A stored workspace can be populated via an upload (e.g., an upload from a client device to a processing element over an upload network path 957). A stored workspace can be delivered to a particular user and/or shared with other particular users via a download (e.g., a download from a processing element to a client device over a download network path 959).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for curating multiple apps from a plurality of heterogeneous application sources, the method comprising:
    applying a rule to application metadata of at least a first application and a second application in an application source, wherein
        the rule comprises a publication rule and a display rule, the publication rule pertains to a first determination of a publication tag for an application, and the display rule pertains to a second determination of a display indicator for the application;
    selecting a first curated portion from the application source, which comprises multiple applications authorized for access by a first user and a second user, for the first user at least by filtering out a first application in the application source based at least in part on the rule and first profile data of the first user;
    selecting a second curated portion from the application source for the second user at least by filtering out the second application in the application source based at least in part on the rule and second profile data of the second user; and
    presenting the first curated portion as a first marketplace for the first user to browse and search the first marketplace and the second curated portion as a second marketplace for the second user to browse or search the second marketplace, wherein the first marketplace is different from the second marketplace.

2. The method of claim 1, wherein at least one of selecting the first curated portion, selecting the second curated portion or presenting the first curated portion and the second curated portion is responsive to respectively receiving a first application view request from the first user and a second application view request from the second user.

3. The method of claim 1, wherein the first or the second curated portion is determined based at least in part on testing a first or a second application at least by dynamically applying a constraint derived from information in the rule to the application metadata of the first or the second application.

4. The method of claim 1, wherein at least one application is added into the first curated portion or is filtered out from the first curated portion or the second curated portion by a state attribute of the at least one application, and the state attribute is controlled at a user interface.

5. The method of claim 4, wherein the state attribute indicates at least one of an authorization state, a pending state, an accepted state, a rejected state, or a published state of the at least one application represented in the application metadata.

6. The method of claim 1, furthering comprising:
determining a publication attribute for an application in the application source at least by applying the publication rule from the rule to the application metadata corresponding to the application, wherein the publication attribute indicates whether the application is to be subsequently used in a determination process that determines whether or not to present the application to the first or the second marketplace.

7. The method of claim 1, wherein the rule comprises a filtering rule that is used to generate a tag for a first curated application, and the tag is compared to the first profile data to determine whether the first curated application is to be added to the first curated portion.

8. The method of claim 1, wherein a publication attribute controls accessibility of the a first curated application by the first user or the accessibility of the first curated application by a particular group of users to which the first user belongs.

9. The method of claim 1, wherein the application source comprises at least one of a local application source that is developed by a local developer sharing a computing resource with the first user or the second user, or an external application source that is developed by an external developer not sharing computing resources with the first user or the second user.

10. The method of claim 1, wherein a difference between the first marketplace and the second marketplace comprises a distinction that the first marketplace comprises a first storefront determined from the first profile data that is different from the second profile data from which a second storefront is determined for the second user to browse or search for a curated application in the second marketplace, the first profile data pertains to a role of the first user, a group to which the first user belongs, a project on which the first user works, or a site at which the first user works, and the second profile data pertains to a different role, a different group, a different project, or a different site for the second user.

11. A non-transitory computer readable medium having stored thereon a sequence of instructions which, when stored in memory and executed by processor, causes the processor to perform a set of acts, the set of acts comprising:
applying a rule to application metadata of at least a first application and a second application in an application source, wherein
the rule comprises a publication rule and a display rule, the publication rule pertains to a first determination of a publication tag for an application, and the display rule pertains to a second determination of a display indicator for the application;
selecting a first curated portion from the application source, which comprises multiple applications authorized for access by a first user and a second user, for the first user at least by filtering out a first application in the application source based at least in part on the rule and first profile data of the first user;
selecting a second curated portion from the application source for the second user at least by filtering out the second application in the application source based at least in part on the rule and second profile data of the second user; and
presenting the first curated portion as a first marketplace for the first user to browse or search the first marketplace and the second curated portion as a second marketplace for the second user to browse or search the second marketplace, wherein the first marketplace is different from the second marketplace.

12. The non-transitory computer readable medium of claim 11, wherein at least one of selecting the first curated portion, selecting the second curated portion or presenting the first curated portion and the second curated portion is responsive to respectively receiving a first application view request from the first user and a second application view request from the second user.

13. The non-transitory computer readable medium of claim 11, wherein the first or the second curated portions are determined based at least in part on testing one or more of the multiple applications at least by applying a constraint derived from information in the rule to the application metadata of the one or more of the multiple applications.

14. The non-transitory computer readable medium of claim 11, wherein at least one application is added into the first curated portion or is filtered out from the first curated portion or the second curated portion by a state attribute of the at least one application, and the state attribute is controlled at a user interface.

15. The non-transitory computer readable medium of claim 14, wherein the state attribute indicates at least one of an authorization state, a pending state, an accepted state, a rejected state, or a published state of the at least one application represented in the application metadata.

16. The non-transitory computer readable medium of claim 11, the set of acts further comprising:
determining a publication attribute for an application in the application source at least by applying the publication rule from the rule to the application metadata corresponding to the application, wherein the publication attribute indicates whether the application is to be subsequently used in a determination process that determines whether or not to present the application to the first or the second marketplace.

17. The non-transitory computer readable medium of claim 11, wherein a publication attribute controls accessibility of the a first curated application by the first user or the accessibility of the first curated application by a particular group of users to which the first user belongs.

18. The non-transitory computer readable medium of claim 11, wherein the publication tag comprises a publication attribute.

19. A system, comprising:
a non-transitory storage medium having stored thereon a sequence of instructions; and
a processor that executes the sequence of instructions, an execution of the sequence of instructions causing the processor to perform a set of acts, the set of acts comprising:
applying a rule to application metadata of at least a first application and a second application in an application source, wherein
the rule comprises a publication rule and a display rule, the publication rule pertains to a first determination of a publication tag for an application, and the display rule pertains to a second determination of a display indicator for the application;
selecting a first curated portion from the application source, which comprises multiple applications authorized for access by a first user and a second user, for the first user at least by filtering out a first application in the application source based at least in part on the rule and first profile data of the first user;
selecting a second curated portion from the application source for the second user at least by filtering out the second application in the application source based at least in part on the rule and second profile data of the second user; and presenting the first curated portion as a first marketplace for the first user to browse or search the first marketplace and the second curated portion as a second marketplace for the second user to browse or search the second marketplace, wherein the first marketplace is different from the second marketplace.

20. The system of claim 19, wherein at least one of selecting the first curated portion, selecting the second curated portion or presenting the first curated portion and the second curated portion is responsive to respectively receiving a first application view request from the first user and a second application view request from the second user.

21. The system of claim 19, the set of acts further comprising:

determining a publication attribute for an application in the source at least by applying a publication rule from the rule to the application metadata corresponding to the application, wherein the publication attribute indicates whether the application is to be subsequently used in a determination process that determines whether or not to present the application to the first or the second marketplace.

22. The system of claim 19, wherein the first marketplace differs from the second marketplace in that the first marketplace comprises a first storefront determined from the first profile data that is different from the second profile data from which a second storefront is determined for the second user to browse or search for a curated application in the second marketplace, the first profile data pertains to a role of the first user, a group to which the first user belongs, a project on which the first user works, or a site at which the first user works, and the second profile data pertains to a different role, a different group, a different project, or a different site for the second user.

* * * * *